(12) United States Patent
Ohtomo et al.

(10) Patent No.: US 10,088,307 B2
(45) Date of Patent: Oct. 2, 2018

(54) SURVEYING INSTRUMENT AND THREE-DIMENSIONAL CAMERA

(71) Applicant: Kabushiki Kaisha TOPCON, Tokyo-to (JP)

(72) Inventors: Fumio Ohtomo, Saitama (JP); Kaoru Kumagai, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 298 days.

(21) Appl. No.: 15/019,360

(22) Filed: Feb. 9, 2016

(65) Prior Publication Data
US 2016/0238385 A1    Aug. 18, 2016

(30) Foreign Application Priority Data

Feb. 16, 2015   (JP) ................... 2015-027482

(51) Int. Cl.
*G01C 3/08* (2006.01)
*H04N 13/25* (2018.01)
(Continued)

(52) U.S. Cl.
CPC ............ *G01C 3/08* (2013.01); *G01C 1/04* (2013.01); *G01C 15/002* (2013.01);
(Continued)

(58) Field of Classification Search
CPC .......... G01C 1/04; G01C 3/08; G01C 15/002; G01S 17/89; G01S 17/023; G01S 7/4817; H04N 13/025
(Continued)

(56) References Cited

U.S. PATENT DOCUMENTS

| 5,249,046 A | 9/1993 | Ulich et al. |
| 8,857,069 B2 | 10/2014 | Adegawa |

(Continued)

FOREIGN PATENT DOCUMENTS

| EP | 2056066 A2 | 5/2009 |
| JP | 2007-248156 A | 9/2007 |

(Continued)

OTHER PUBLICATIONS

"Fusion of Terrestrial LiDAR Point Clouds with Color Imagery," http://www.cis.rit.edu/DocumentLibrary/admin/uploads/CIS000202.PDF, May 16, 2013, Axel, et al.

(Continued)

*Primary Examiner* — Mark Hellner
(74) *Attorney, Agent, or Firm* — Nields, Lemack & Frame, LLC

(57) ABSTRACT

The invention provides a surveying instrument, which comprises a light emitting element for emitting a distance measuring light, a distance measuring light projecting unit for projecting the distance measuring light, a light receiving unit for receiving a reflected distance measuring light, a photodetection element for receiving the reflected distance measuring light and for producing a photodetection signal and a distance measuring unit for performing a distance measurement based on a light receiving result from the photodetection element, further comprises a first optical axis deflecting unit disposed on a projection optical axis of the distance measuring light for deflecting an optical axis of the distance measuring light at a deflection angle as required and in a direction as required, a second optical axis deflecting unit disposed on a light receiving optical axis for deflecting the reflected distance measuring light at the same deflection angle and in the same direction as the first optical axis deflecting unit and a projecting direction detecting unit for
(Continued)

detecting a deflection angle and a deflecting direction by the first optical axis deflecting unit, wherein it is so arranged that the distance measuring light is projected through the first optical axis deflecting unit and the reflected distance measuring light is received by the photodetection element through the second optical axis deflecting unit and a three-dimensional data of a measuring point is obtained based on a distance measuring result of the distance measuring unit and a detection result of the projecting direction detecting unit.

9 Claims, 5 Drawing Sheets

(51) Int. Cl.
*G01C 1/04* (2006.01)
*G01C 15/00* (2006.01)
*G01S 17/89* (2006.01)
*G01S 7/481* (2006.01)
*H04N 13/02* (2006.01)
*G01S 17/02* (2006.01)

(52) U.S. Cl.
CPC .......... *G01S 7/4817* (2013.01); *G01S 17/023* (2013.01); *G01S 17/89* (2013.01); *H04N 13/025* (2013.01); *H04N 13/25* (2018.05)

(58) Field of Classification Search
USPC ........................................ 356/4.01
See application file for complete search history.

(56) References Cited

U.S. PATENT DOCUMENTS

| | | |
|---|---|---|
| 2006/0242850 A1 | 11/2006 | Ammann et al. |
| 2008/0075326 A1* | 3/2008 | Otani .............. G01C 3/00 382/106 |
| 2008/0278715 A1* | 11/2008 | Swenson ........... G01S 7/4812 356/141.5 |
| 2012/0105923 A1* | 5/2012 | Mikkelsen ....... G02B 26/0891 358/475 |
| 2012/0216413 A1* | 8/2012 | Adegawa ............. G01C 9/00 33/290 |
| 2013/0174432 A1 | 7/2013 | Kumagai et al. |
| 2013/0293681 A1* | 11/2013 | Borowski ........... G01S 7/483 348/46 |
| 2016/0238708 A1 | 8/2016 | Ohtomo et al. |
| 2017/0227357 A1 | 8/2017 | Ohtomo et al. |

FOREIGN PATENT DOCUMENTS

| | | |
|---|---|---|
| JP | 4996371 B2 | 8/2012 |
| WO | 2004/099849 A1 | 11/2004 |
| WO | 2013/177650 A1 | 12/2013 |

OTHER PUBLICATIONS

European communication dated Jul. 8, 2016 in corresponding European patent application No. 16155684.0.
European communication dated Jul. 5, 2016 in co-pending European patent application No. 16155681.6.
Office action dated Feb. 16, 2018 in co-pending U.S. Appl. No. 15/019,393.
Notice of allowance dated Jun. 5, 2018 in co-pending U.S. Appl. No. 15/019,393.

* cited by examiner

THE SAME DEFLECTION ANGLE

A AND A', B AND B' ARE ROTATED IN SYNCHRONIZATION

SURVEYING INSTRUMENT AND THREE-DIMENSIONAL CAMERA

BACKGROUND OF THE INVENTION

The present invention relates to a surveying instrument capable of easily acquiring a point cloud data and a three-dimensional camera capable of acquiring an image and an image with a three-dimensional data.

There is a laser scanner as a surveying instrument capable of acquiring the point cloud data, the laser scanner scans a distance measuring light as projected in a vertical direction and a horizontal direction by a deflecting mirror rotatable in the vertical direction and a deflecting mirror rotatable in the horizontal direction, and acquires the point cloud data.

Such laser scanner has a complicated structure and is expensive. Further, there is a surveying instrument including an image acquiring device together with a laser scanner and acquiring an image at the same time as acquiring the point cloud data and capable of acquiring an image with the three-dimensional data. However, such surveying instrument also has a complicated structure and is a large size and expensive.

SUMMARY OF THE INVENTION

It is an object of the present invention to provide a simple and low cost surveying instrument capable of acquiring a point cloud data and further to provide a simple and low cost three-dimensional camera capable of acquiring an image with a three-dimensional data.

To attain the object as described above, a surveying instrument according to the present invention comprises a light emitting element for emitting a distance measuring light, a distance measuring light projecting unit for projecting the distance measuring light, a light receiving unit for receiving a reflected distance measuring light, a photodetection element for receiving the reflected distance measuring light and for producing a photodetection signal and a distance measuring unit for performing a distance measurement based on a light receiving result from the photodetection element, further comprises a first optical axis deflecting unit disposed on a projection optical axis of the distance measuring light for deflecting an optical axis of the distance measuring light at a deflection angle as required and in a direction as required, a second optical axis deflecting unit disposed on a light receiving optical axis for deflecting the reflected distance measuring light at the same deflection angle and in the same direction as the first optical axis deflecting unit and a projecting direction detecting unit for detecting a deflection angle and a deflecting direction by the first optical axis deflecting unit, wherein it is so arranged that the distance measuring light is projected through the first optical axis deflecting unit and the reflected distance measuring light is received by the photodetection element through the second optical axis deflecting unit and a three-dimensional data of a measuring point is obtained based on a distance measuring result of the distance measuring unit and a detection result of the projecting direction detecting unit.

Further, in the surveying instrument according to the present invention, the distance measuring light projecting unit has a projection optical axis deflecting unit for coinciding the projection optical axis with the light receiving optical axis, wherein the first optical axis deflecting unit is provided at a central portion of the second optical axis deflecting unit and the distance measuring light is deflected by the projection optical axis deflecting unit and projected through the first optical axis deflecting unit.

Further, in the surveying instrument according to the present invention, the first optical axis deflecting unit is composed by an overlapping pair of circular first optical prisms, the second optical axis deflecting unit is composed by an overlapping pair of circular second optical prisms, each of the first optical prisms is independently rotatable, each of the second optical prisms is independently rotatable and it is so arranged that one of the first optical prisms and one of the second optical prisms are rotated in synchronization with each other, and it is so arranged that the other of the first optical prisms and the other of the second optical prisms are rotated in synchronization with each other.

Further, in the surveying instrument according to the present invention, the second optical axis deflecting unit is composed by the overlapping pair of optical prisms and it is so arranged that each of the optical prisms is independently rotatable.

Further, in the surveying instrument according to the present invention, the optical prisms which compose the second optical axis deflecting unit are Fresnel prisms.

Further, the surveying instrument according to the present invention further comprises an arithmetic processing unit and a posture detecting device, wherein the posture detecting device is capable of detecting a tilt angle and a tilting direction of the projection optical axis with respect to the horizontal and the arithmetic processing unit is arranged so as to correct a distance measuring result of the distance measuring unit based on a detection result of the posture detecting device.

Further, a three-dimensional camera according to the present invention comprises the surveying instrument, the arithmetic processing unit and an image pickup device having an image pickup optical axis in parallel with the projection optical axis and having a known relation with the projection optical axis, wherein the arithmetic processing unit is configured so as to acquire an image with a three-dimensional data by associating a distance measuring result obtained by the surveying instrument with an image acquired by the image pickup device.

Furthermore, the three-dimensional camera according to the present invention comprises a posture detecting device, wherein the posture detecting device is capable of detecting a tilt angle and a tilting direction of the projection optical axis with respect to the horizontal and the arithmetic processing unit is configured so as to correct a distance measuring result of the distance measuring unit based on a detection result of the posture detecting device.

According to the present invention, the surveying instrument comprises a light emitting element for emitting a distance measuring light, a distance measuring light projecting unit for projecting the distance measuring light, a light receiving unit for receiving a reflected distance measuring light, a photodetection element for receiving the reflected distance measuring light and for producing a photodetection signal and a distance measuring unit for performing a distance measurement based on a light receiving result from the photodetection element, further comprises a first optical axis deflecting unit disposed on a projection optical axis of the distance measuring light for deflecting an optical axis of the distance measuring light at a deflection angle as required and in a direction as required, a second optical axis deflecting unit disposed on a light receiving optical axis for deflecting the reflected distance measuring light at the same deflection angle and in the same direction as the first optical axis deflecting unit and a projecting direction detecting unit for detecting a deflection angle and a deflecting direction by the first optical axis deflecting unit, wherein it is so arranged that the distance measuring light is projected through the first optical axis deflecting unit and the reflected distance measuring light is received by the photodetection element through the second optical axis deflecting unit and a three-dimensional data of a measuring point is obtained based on a distance measuring result of the distance measuring unit and a detection result of the projecting direction detecting unit. As a result, the three-dimensional data of the measuring point at an arbitrary position can be acquired with a simple structure.

Further, according to the present invention, in the surveying instrument, the distance measuring light projecting unit has a projection optical axis deflecting unit for coinciding the projection optical axis with the light receiving optical axis, wherein the first optical axis deflecting unit is provided at a central portion of the second optical axis deflecting unit and the distance measuring light is deflected by the projection optical axis deflecting unit and projected through the first optical axis deflecting unit. As a result, the first optical axis deflecting unit and the second optical axis deflecting unit can be integrated, and the structure can be simplified.

Further, according to the present invention, in the surveying instrument, the first optical axis deflecting unit is composed by an overlapping pair of circular first optical prisms, the second optical axis deflecting unit is composed by an overlapping pair of circular second optical prisms, each of the first optical prisms is independently rotatable, each of the second optical prisms is independently rotatable and it is so arranged that one of the first optical prisms and one of the second optical prisms are rotated in synchronization with each other, and it is so arranged that the other of the first optical prisms and the other of the second optical prisms are rotated in synchronization with each other. As a result, the distance measuring light can be scanned in an arbitrary mode with a simple structure and the point cloud data can be acquired easily.

Further, according to the present invention, in the surveying instrument, the second optical axis deflecting unit is composed by the overlapping pair of optical prisms and it is so arranged that each of the optical prisms is independently rotatable. As a result, the distance measuring light can be scanned in an arbitrary mode with simple structure, the point cloud data can be acquired easily, and further, a driving system and a control system of the second optical axis deflecting unit can be simplified.

Further, according to the present invention, in the surveying instrument, the optical prisms which compose the second optical axis deflecting unit are Fresnel prisms. As a result, a thickness of the optical prism can be thinned, and a size and a weight can be reduced.

Further, according to the present invention, the surveying instrument further comprises an arithmetic processing unit and a posture detecting device, wherein the posture detecting device is capable of detecting a tilt angle and a tilting direction of the projection optical axis with respect to the horizontal and the arithmetic processing unit is arranged so as to correct a distance measuring result of the distance measuring unit based on a detection result of the posture detecting device. As a result, even in a case where a measurement is performed under such condition that the surveying instrument is carried, the measurement can be performed with high accuracy.

Further, according to the present invention, the three-dimensional camera comprises the surveying instrument, the arithmetic processing unit and an image pickup device having an image pickup optical axis in parallel with the projection optical axis and having a known relation with the projection optical axis, wherein the arithmetic processing unit is configured so as to acquire an image with a three-dimensional data by associating a distance measuring result obtained by the surveying instrument with an image acquired by the image pickup device. As a result, the structure can be simplified.

Furthermore, according to the present invention, the three-dimensional camera further comprises a posture detecting device, wherein the posture detecting device is capable of detecting a tilt angle and a tilting direction of the projection optical axis with respect to the horizontal and the arithmetic processing unit is configured so as to correct a distance measuring result of the distance measuring unit based on a detection result of the posture detecting device. As a result, even in a case where measurement and photographing are performed under such condition that the surveying instrument is carried, a highly accurate image with the three-dimensional data can be acquired.

DETAILED DESCRIPTION OF THE PREFERRED EMBODIMENT

A description will be given below on an embodiment of the present invention by referring to the attached drawings.

Figure 1:
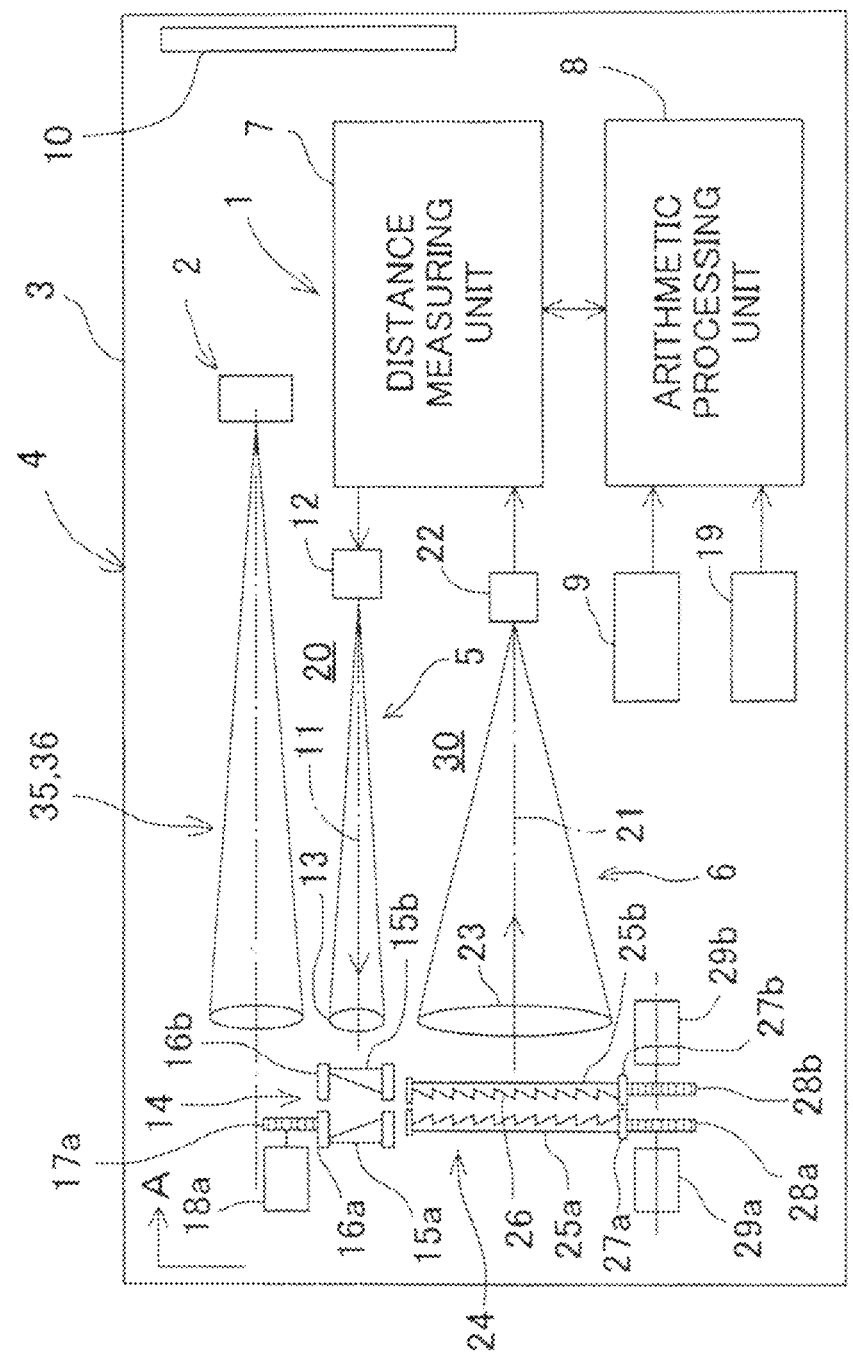
FIG. 1 is a schematical drawing of a three-dimensional camera according to an embodiment of the present invention.

FIG. 1 is a schematical diagram to show a surveying instrument and a three-dimensional camera comprising the surveying instrument according to the embodiment of the present invention.

In FIG. 1, reference numeral 1 denotes a surveying instrument, reference numeral 2 denotes an image pickup device and reference numeral 3 denotes a case for accommodating the surveying instrument 1 and the image pickup device 2. The surveying instrument 1 and the image pickup device 2 integrally make up a three-dimensional camera 4. The case 3 may be installed on a tripod or may be portable (handheld).

First, a description will be given on the surveying instrument 1.

The surveying instrument 1 has a distance measuring light projecting unit 5, a light receiving unit 6, a distance measuring unit 7, an arithmetic processing unit 8, a projecting direction detecting unit 9, a display unit 10 and a posture detecting device 19.

The distance measuring light projecting unit 5 has a projection optical axis 11, a light emitting element, for instance, a laser diode (LD) 12 is provided on the projection optical axis 11, and further, a projecting lens 13 and a first optical axis deflecting unit 14 are disposed on the projection optical axis 11.

Further, a description will be given on the first optical axis deflecting unit 14.

On the projection optical axis 11, two first optical prisms 15a and 15b are provided, and each of the first optical prisms 15a and 15b is arranged rotatably around the projection optical axis 11 independently and individually. As to be descried later, the first optical prisms 15a and 15b deflect an optical axis of the distance measuring light projected from the projecting lens 13 in an arbitrary direction by controlling rotating directions, rotating amounts and rotating speeds of the first optical prisms 15a and 15b.

Materials of the first optical prisms 15a and 15b are preferably optical glass and the first optical prisms 15a and 15b are manufactured with high accuracy so as to have a same and known refractive index. By manufacturing the first optical prisms 15a and 15b with high accuracy, a luminous flux can be deflected to a predetermined direction without diffusing the distance measuring light, and further, an occurrence of distortion of a cross-section of a luminous flux or the like can be prevented, which enables a highly accurate distance measurement, and further, enables a long distance measurement.

Outer shapes of the first optical prisms 15a and 15b are circular with the projection optical axis 11 as the center respectively, a first ring gear 16a is fitted with an outer periphery of the first optical prism 15a and a first ring gear 16b is fitted with an outer periphery of the first optical prism 15b.

A first driving gear 17a meshes with the first ring gear 16a. The first driving gear 17a is fixed to an output shaft of a first motor 18a. Similarly, a first driving gear 17b meshes with the first ring gear 16b and the first driving gear 17b is fixed to an output shaft of a first motor 18b. The first motors 18a and 18b are electrically connected to the arithmetic processing unit 8.

The first motors 18a and 18b are motors capable of detecting a rotation angle or motors which rotate corresponding to a driving input value, for instance, a pulse motor is used. Alternatively, a rotation detector for detecting a rotating amount of the motor such as an encoder or the like, for example, may be used for detecting the rotating amount of the motor.

The projecting direction detecting unit 9 counts driving pulses input to the first motors 18a and 18b and detects the rotation angles of the first motors 18a and 18b or detects the rotation angles of the first motors 18a and 18b based on signals from the encoders. Further, the projecting direction detecting unit 9 calculates rotation positions of the first optical prisms 15a and 15b based on the rotation angles of the first motors 18a and 18b, calculates deflection angle and a projecting direction of the distance measuring light based on the refractive indexes and the rotation positions of the first optical prisms 15a and 15b, and a calculation result is inputted to the arithmetic processing unit 8.

Figure 2:
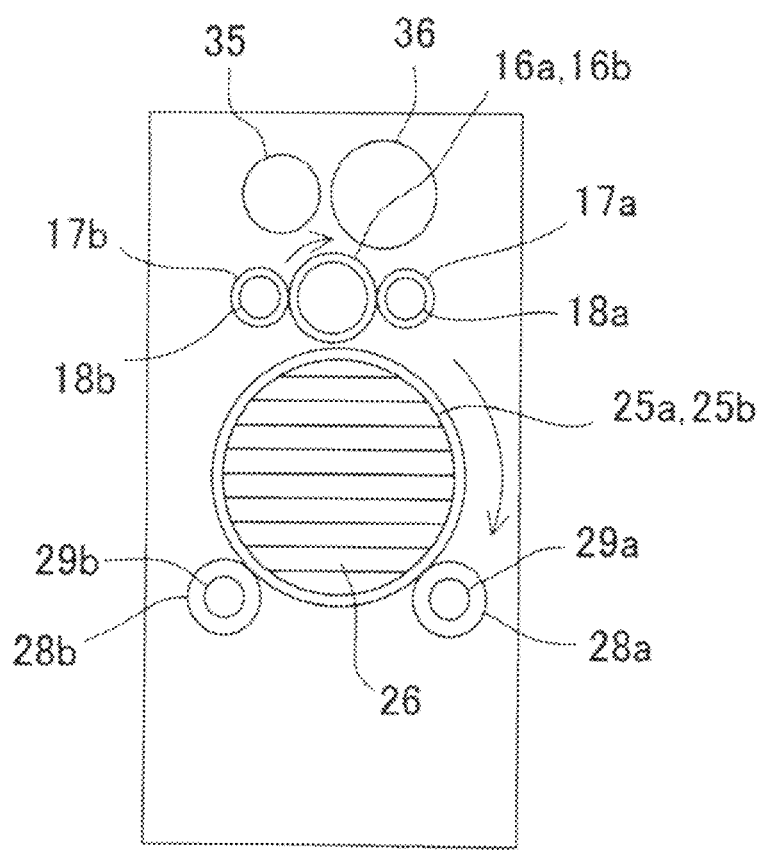
FIG. 2 is an arrow diagram along an arrow A of FIG. 1.

In FIG. 1, the first driving gear 17a and the first motor 18a are shown on an upper side of the first ring gear 16a, but actually, the first driving gears 17a and 17b are provided at positions not interfering with a visual field of the image pickup device 2 as described later, at sides of the first ring gear 16a and 16b as shown in FIG. 2, for instance.

The projecting lens 13, the first optical prisms 15a and 15b or the like make up a projection optical system 20.

A description will be given on the light receiving unit 6. The light receiving unit 6 receives a reflected distance measuring light from an object. The light receiving unit 6 has a light receiving optical axis 21 and the light receiving optical axis 21 is in parallel with the projection optical axis 11.

On the light receiving optical axis 21, a photodetection element 22, for instance, a photodiode (PD) is provided, and the photodetection element 22 receives the reflected distance measuring light and produces a photodetection signal. Further, on an objective side of the light receiving optical axis 21, a light receiving lens 23 and a second optical axis deflecting unit 24 are disposed.

The second optical axis deflecting unit 24 has a pair of second optical prisms 25a and 25b on the light receiving optical axis 21 which are overlapped each other and arranged in parallel. As for the second optical prisms 25a and 25b, a Fresnel prism is preferably used respectively in order to reduce a size of the instrument.

The Fresnel prism used as the second optical prisms 25a and 25b is composed of a large number of prism elements 26 formed in parallel with each other and has a plate shape. Each of the prism elements 26 has the same optical characteristics and each of the prism elements 26 has the same refractive index and deflection angle as the first optical prisms 15a and 15b.

The Fresnel prism may be manufactured by an optical glass but may be molded by an optical plastic material. By molding the Fresnel prism by the optical plastic material, a low cost Fresnel prism can be manufactured.

Each of the second optical prisms 25a and 25b is arranged in such a manner that each of the second optical prism 25a and 25b rotates with the light receiving optical axis 21 as the center individually. Similarly to the first optical prisms 15a and 15b, the second optical prisms 25a and 25b deflect an optical axis of the reflected distance measuring light as entered in an arbitrary direction by controlling rotating directions, rotating amounts and rotating speeds of the second optical prisms 25a and 25b.

Outer shapes of the second optical prisms 25a and 25b are circles with the light receiving optical axis 21 as the center, respectively, and taking an expansion of the reflected distance measuring light into consideration, diameters of the second optical prisms 25a and 25b are larger than the diameters of the first optical prisms 15a and 15b so that a sufficient light amount can be obtained.

A second ring gear 27a is fitted with an outer periphery of the second optical prism 25a and a second ring gear 27b is fitted with an outer periphery of the second optical prism 25b.

A second driving gear 28a meshes with the second ring gear 27a, and the second driving gear 28a is fixed to an output shaft of a second motor 29a. A second driving gear 28b meshes with the second ring gear 27b, and the second driving gear 28b is fixed to an output shaft of a second motor 29b. The second motors 29a and 29b are electrically connected to the arithmetic processing unit 8.

As the second motors 29a and 29b, similarly to the first motors 18a and 18b, motors capable of detecting a rotation angle or motors which rotate corresponding to a driving input value, for instance, a pulse motor is used. Alternatively, a rotation detector for detecting a rotating amount (rotation angle) of the motor such as an encoder or the like, for example, may be used for detecting the rotating amount of the motor. The rotating amounts of the second motors 29a and 29b are detected and a synchronization control with the first motors 18a and 18b is carried out by the arithmetic processing unit 8.

The second driving gears 28a and 28b and the second motors 29a and 29b are provided at positions not interfering with the distance measuring light projecting unit 5, for instance, on a lower side of the second ring gears 27a and 27b.

The second optical prisms 25a and 25b, the light receiving lens 23, or the like, make up a light receiving optical system 30.

The distance measuring unit 7 controls the light emitting element 12 and emits a laser beam as the distance measuring light. The reflected distance measuring light reflected from an object to be measured enters through the second optical prisms 25a and 25b and the light receiving lens 23 and is received by the photodetection element 22.

The photodetection element 22 sends the photodetection signal to the distance measuring unit 7 and the distance measuring unit 7 performs distance measurement of a measuring point (a point where the distance measuring light is projected) based on the photodetection signal from the photodetection element 22.

The arithmetic processing unit 8 is configured by an input/output control unit, an arithmetic unit (CPU), a storage unit, or the like. The storage unit stores programs such as a distance measuring program for controlling a distance measuring operation, a control program for controlling drivings of the first motors 18a and 18b and the second motors 29a and 29b, an image display program for displaying an image data, a distance measuring data, or the like, on the display unit 10, or the like, and further, in the storage unit, measurement results of the distance measuring data, the image data, or the like, are stored.

The posture detecting device 19 detects a posture (a tilt angle and a tilting direction) with respect to the horizontal of the three-dimensional camera 4. A detection result is inputted to the arithmetic processing unit 8.

The image pickup device 2 has a wide-angle camera 35 and a narrow-angle camera 36, the wide-angle camera 35 has a wide-field angle, for instance 300, while the narrow-angle camera 36 has a field angle narrower than the field angle of the wide-angle camera 35, for instance 5°. Further, it is preferable that the field angle of the narrow-angle camera 36 is equal to or slightly larger than a range to acquire a point cloud data (to be described later) obtained by the distance measuring light projecting unit 5.

Further, image pickup elements of the wide-angle camera 35 and the narrow-angle camera 36 are a CCD or a CMOS sensor which are an aggregate of pixels, and it is so arranged that a position of each pixel on an image element can be specified. For instance, the position of each pixel is specified by a coordinate system with an optical axis of each camera as an origin point.

The optical axis of the wide-angle camera 35 and the optical axis of the narrow-angle camera 36 are both parallel to the projection optical axis 11, and further, the optical axis of the wide-angle camera 35, the optical axis of the narrow-angle camera 36 and the projection optical axis 11 are in a known relation.

Figure 3A:
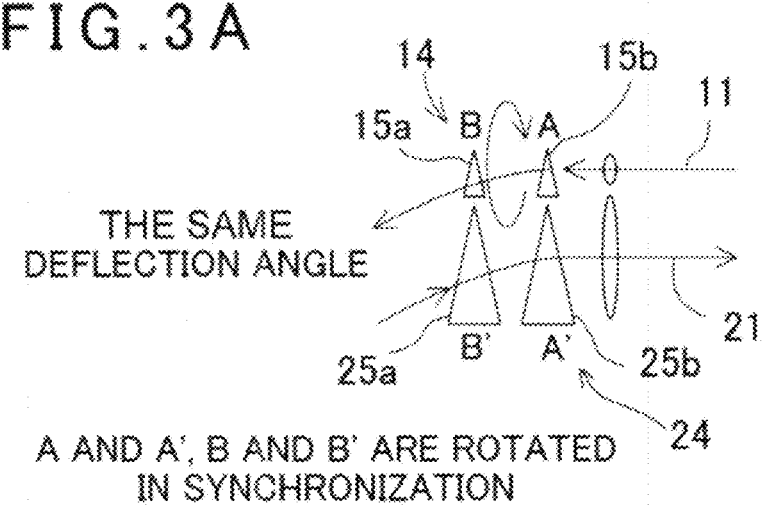
FIG. 3A, FIG. 3B and FIG. 3C are explanatory drawings to show an operation of first and second optical axis deflecting units.

First, a description will be given on a measurement operation by the surveying instrument 1 by referring to FIG. 3A and FIG. 3B. To simplify the explanation, in FIG. 3A, the second optical prisms 25a and 25b are shown as single prisms, respectively. Further, the first optical prisms 15a and 15b and the second optical prisms 25a and 25b as shown in FIG. 3A are in a state in which maximum deflection angles can be obtained. Further, the minimum deflection angle is a position where either one of the first optical prisms 15a and 15b and either one of the second optical prisms 25a and 25b are rotated by 180°, the deflection angle becomes 0°, and an optical axis of the laser beam as projected becomes parallel with the projection optical axis 11.

A distance measuring light is emitted from the light emitting element 12, the distance measuring light is turned to a parallel luminous flux by the projecting lens 13 and projected toward an object to be measured or a measurement target area through the first optical axis deflecting unit 14 (the first optical prisms 15a and 15b). Here, by passing through the first optical axis deflecting unit 14, the distance measuring light is deflected to a direction as required and projected by the first optical prisms 15a and 15b.

The reflected distance measuring light as reflected by the object to be measured or by the measurement target area is incident through the second optical axis deflecting unit 24 and is focused to the photodetection element 22 by the light receiving lens 23.

Since the reflected distance measuring light passes through the second optical axis deflecting unit 24, the optical axis of the reflected distance measuring light is deflected by the second optical prisms 25a and 25b so as to coincide with the light receiving optical axis 21 (FIG. 3A).

That is, the rotation positions, the rotating directions and the rotating speeds of the first optical prisms 15a and 15b and the second optical prisms 25a and 25b are synchronously controlled so that the first optical axis deflecting unit 14 and the second optical axis deflecting unit 24 have the same deflection angles at all times.

Specifically, the first motor 18a and the second motor 29a are synchronously controlled by the arithmetic processing unit 8 so that the first optical prism 15a and the second optical prism 25a are deflected in the same direction at all times. Further, the first motor 18b and the second motor 29b are synchronously controlled by the arithmetic processing unit 8 so that the first optical prism 15b and the second optical prism 25b are deflected in the same direction at all times.

Further, by a combination of the rotation positions of the first optical prism 15a and the first optical prism 15b, the deflecting direction and the deflection angle of distance measuring light to be projected can be arbitrarily deflected.

Further, under a condition where a positional relation between the first optical prism 15a and the first optical prism 15b is fixed (under a condition where the deflection angles obtained by the first optical prism 15a and the first optical prism 15b are fixed), by rotating the first optical prism 15a and the first optical prism 15b integrally, a locus drawn by the distance measuring light passing through the first optical axis deflecting unit 14 becomes a circle with the projection optical axis 11 as the center.

Therefore, by rotating the first optical axis deflecting unit 14 while emitting the laser beam from the light emitting element 12, the distance measuring light can be scanned by the locus of the circle.

It is to be noted that in this case also, it is needless to say that the second optical axis deflecting unit 24 rotates in the same direction at the same speed in synchronization with the first optical axis deflecting unit 14.

Figure 3B:
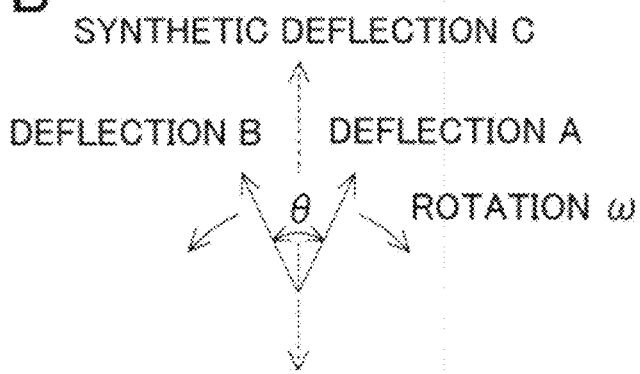

Next, FIG. 3B illustrates a case in which the first optical prism 15a and the first optical prism 15b are relatively rotated. Assuming that a deflecting direction of the optical axis as deflected by the first optical prism 15a is a deflection "A" and the deflecting direction of the optical axis as deflected by the first optical prism 15b is a deflection "B", the deflection of the optical axis by the first optical prisms 15a and 15b becomes a synthetic deflection "C" as an angle difference θ between the first optical prisms 15a and 15b.

Therefore, each time the angle difference θ is changed, by rotating the first optical axis deflecting unit 14 once, the distance measuring light can be scanned linearly.

Figure 3C:
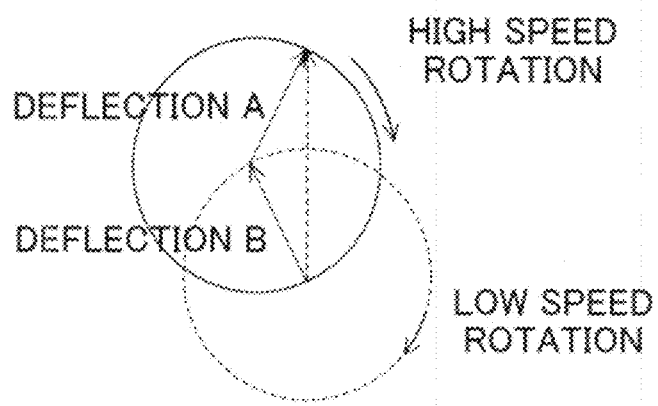

Further, as illustrated in FIG. 3C, when the first optical prism 15b is rotated at a rotating speed lower than the rotating speed of the first optical prism 15a, since the distance measuring light is rotated while the angle difference θ is gradually increased, the scanning locus of the distance measuring light becomes a spiral form.

Furthermore, by controlling the rotating direction and the rotating speed of the first optical prism 15a and the first optical prism 15b individually, the scanning locus of the distance measuring light is made in a radial direction (scanning in the radial direction) with the projection optical axis 11 as the center or in a horizontal direction or in a vertical direction or the like, and various scanning states can be obtained.

As a mode of measurement, by performing a distance measurement by fixing the first optical axis deflecting unit 14 and the second optical axis deflecting unit 24 per each deflection angle as required, the distance measurement can be performed with respect to a specific measuring point. Further, by executing the distance measurement while deflecting the deflection angles of the first optical axis deflecting unit 14 and the second optical axis deflecting unit 24, that is, by executing the distance measurement while scanning the distance measuring light, the point cloud data can be acquired.

Further, the projection directional angle of each distance measuring light can be detected by the rotation angles of the first motors 18a and 18b, and by associating the projection directional angle with the distance measurement data, the three-dimensional point cloud data can be acquired.

Next, the three-dimensional data is acquired and the image data can also be acquired.

As described above, the image pickup device 2 has the wide-angle camera 35 and the narrow-angle camera 36.

The wide-angle camera 35 is primarily used for observation, and a wide-angle image acquired by the wide-angle camera 35 is displayed on the display unit 10.

A measuring operator searches an object to be measured from an image displayed on the display unit 10 or selects the object to be measured.

When the object to be measured is selected, the three-dimensional camera 4 is directed so that the object to be measured is captured by the narrow-angle camera 36. A narrow-angle image acquired by the narrow-angle camera 36 is displayed on the display unit 10. As a display method, the display of the wide-angle image by the wide-angle camera 35 and the display of the narrow-angle image by the narrow-angle camera 36 may be switched. Alternatively, the display unit 10 may be divided and display the narrow-angle image by the narrow-angle camera 36 on a divided portion or a window may be provided to display the narrow-angle image on the window.

Since the narrow-angle image acquired by the narrow-angle camera 36 is equal to or approximately equal to a measurement range of the surveying instrument 1, the measuring operator can visually specify the measurement range easily.

Further, since the projection optical axis 11 and the optical axis of the narrow-angle camera 36 are parallel, and both the optical axes are in a known relation, the arithmetic processing unit 8 can match the image center with the projection optical axis 11 on the narrow-angle image by the narrow-angle camera 36. Further, by detecting the projection angle of the distance measuring light, the arithmetic processing unit 8 can specify a measuring point on the image based on the projection angle. Therefore, an association between the three-dimensional data of the measuring point and the narrow-angle image can be performed easily, and the narrow-angle image as acquired by the narrow-angle camera 36 can be turned to an image with the three-dimensional data.

Figure 4A:
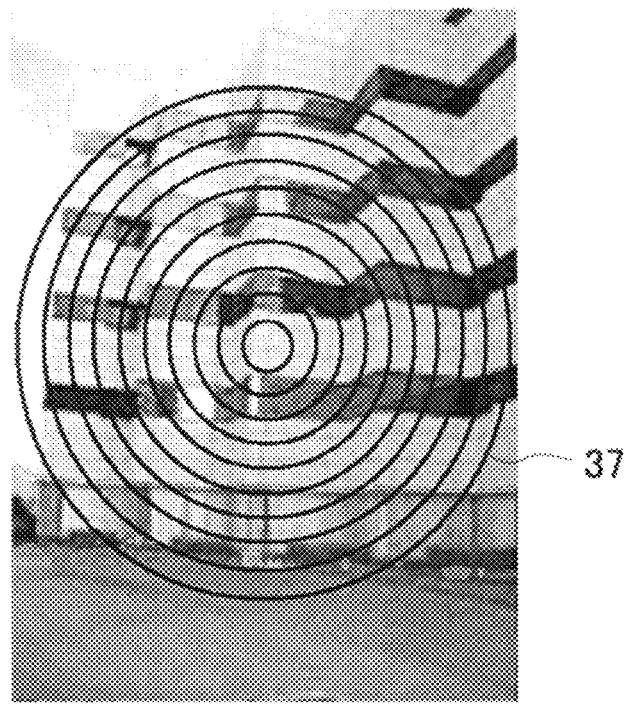
FIG. 4A and FIG. 4B are explanatory drawings to show a relation between an acquired image and a scanning locus.
Figure 4B:
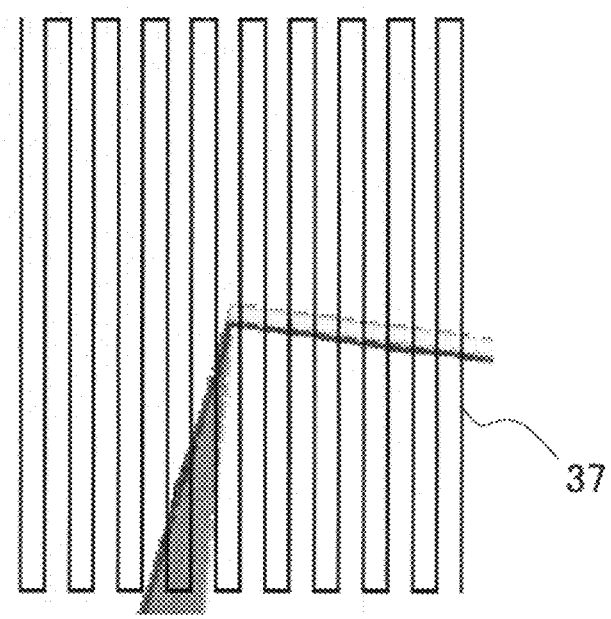

FIG. 4A and FIG. 4B show a relation between an image acquired by the narrow-angle camera 36 and an acquiring of the point cloud data. FIG. 4A shows a case in which the distance measuring light is scanned in a concentric and multi-circular form and FIG. 4B shows a case in which the distance measuring light is reciprocally scanned linearly. In the figure, reference numeral 37 denotes a scanning locus and the measuring points are positioned on the scanning locus.

Further, in a case where the measurement of a wide range is executed, the wide-angle image acquired by the wide-angle camera 35 is made the measurement range, the narrow-angle images acquired by the narrow-angle camera 36 are fitted into the wide-angle images like a patchwork and hence the measurement can be performed without a waste or without leaving an unmeasured portion.

Further, the three-dimensional camera 4 in the present embodiment comprises the posture detecting device 19.

The posture detecting device 19 is for detecting a posture of the three-dimensional camera 4 with respect to the horizontal, that is, a tilt angle and a tilting direction of the projection optical axis 11. In a case where the three-dimensional camera 4 is installed via a tripod, based on the detection result of the posture detecting device 19, the three-dimensional camera 4 is installed horizontally and the measurement can be performed under a condition where the three-dimensional camera 4 is horizontal. Therefore, a correcting operation such as correcting of a measured value by considering the tilting of the three-dimensional camera 4, or the like, is no longer needed.

In a case where the three-dimensional camera 4 is used under a carried condition (a handheld condition), the posture of the three-dimensional camera 4, when measurement is performed is detected by the posture detecting device 19, and the arithmetic processing unit 8 corrects the measured value based on the tilt angle and the tilting direction as detected. Thereby, even under a condition close to a camera shake, the measurement as corrected with high accuracy becomes possible.

In the embodiment as described above, the second optical prisms 25a and 25b are made of the Fresnel prisms, but if there is a room, the second optical prisms 25a and 25b may be constituted by a single prism, respectively.

Figure 5:
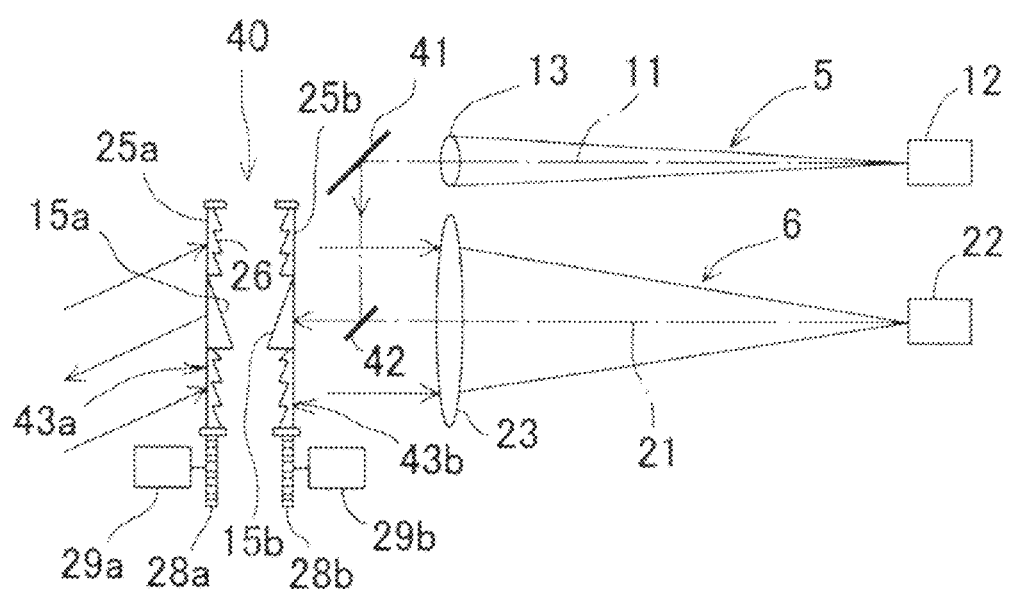
FIG. 5 is a schematical drawing to show an essential portion of another embodiment.

FIG. 5 shows another embodiment.

In the another embodiment, the first optical axis deflecting unit 14 and the second optical axis deflecting unit 24 in the embodiment as described above are integrated as an optical axis deflecting unit 40. It is to be noted that in FIG. 5, what are equivalent to components as shown in FIG. 1 are referred by the same symbol.

A first reflection mirror 41 as a deflecting optical member is provided on a projection optical axis 11 of a distance measuring light projecting unit 5. Further, a second reflection mirror 42 as the deflecting optical member is faced with the first reflection mirror 41 and disposed on a light receiving optical axis 21. Further, the first reflection mirror 41 and the second reflection mirror 42 are set with a positional relation so that the projection optical axis 11 as deflected by the first reflection mirror 41 and the second reflection mirror 42 coincides with a light receiving optical axis 21 of a light receiving unit 6. The first reflection mirror 41 and the second reflection mirror 42 make up the projection optical axis deflecting unit.

It is to be noted that a size of the second reflection mirror 42 will suffice if the size is enough to reflect a distance measuring light. Therefore, since a luminous flux diameter of the distance measuring light is smaller, the size of the second reflection mirror 42 may be smaller. Since a luminous flux diameter of the reflected distance measuring light is larger, a light amount of the reflected distance measuring light as intercepted by the second reflection mirror 42 is small and does not exert influence on the distance measurement.

The optical axis deflecting unit 40 has circular-shaped combined optical prisms 43a and 43b disposed in parallel on the light receiving optical axis 21.

Since the combined optical prisms 43a and 43b have similar structure, a description will be given below on the combined optical prism 43a.

The combined optical prism 43a is composed of a second optical prism 25a and a first optical prism 15a.

The second optical prism 25a is a Fresnel prism in which a large number of prism elements 26 are formed, and at a central portion of the Fresnel prism, the prism element 26 is cut out circularly, the first optical prism 15a is provided at the central portion, and the second optical prism 25a and the first optical prism 15a are integrated. Further, the directions of the prism elements 26 of the first optical prism 15a and the second optical prism 25a are coincided with each other.

The first optical prism 15a and the second optical prism 25a are made of an optical plastic material and may be integrally molded by molding or it may be so designed that the second optical prism 25a is molded and a prism (the first optical prism 15a) manufactured by an optical glass is attached to the second optical prism 25a.

A distance measuring light emitted from a light emitting element 12 turned to a parallel luminous flux by a projecting lens 13 and is deflected by the first reflection mirror 41 and the second reflection mirror 42 so as to be projected along the light receiving optical axis 21.

Since the distance measuring light passes through the central portion of the combined optical prisms 43a and 43b, that is, the first optical prisms 15a and 15b, the distance measuring light is deflected to a direction as required and an angle as required, and projected.

Further, the reflected distance measuring light as reflected by the object to be measured passes through the second optical prisms 25a and 25b portions of the combined optical prisms 43a and 43b, is deflected so as to be in parallel with the light receiving optical axis 21, received by the photodetection element 22 and distance measurement is performed based on the light receiving result of the photodetection element 22.

In this another embodiment, since the first optical axis deflecting unit 14 is omitted, the structure is further simplified.

Further, motors used in a deflecting unit can be only the second motors 29a and 29b and controlling of the motors are also simplified.

As described above, according to the present invention, a point cloud data can be easily acquired by a simple structure. Further, in a case where an image is to be acquired at the same time, since an optical axis of an image pickup device coincides with a distance measuring optical axis (or in a parallel and known relation), association between the image and the point cloud data can be performed easily and the image with a three-dimensional data can be acquired easily.

The invention claimed is:

1. A surveying instrument comprising; a light emitting element for emitting a distance measuring light, a distance measuring light projecting unit for projecting said distance measuring light, a light receiving unit for receiving a reflected distance measuring light, a photodetection element for receiving the reflected distance measuring light and for producing a photodetection signal and a distance measuring unit for performing a distance measurement based on a light receiving result from said photodetection element, further comprising a first optical axis deflecting unit disposed on a projection optical axis of said distance measuring light for deflecting an optical axis of said distance measuring light at a deflection angle as required and in a direction as required, a second optical axis deflecting unit disposed on a light receiving optical axis for deflecting the reflected distance measuring light at the same deflection angle and in the same direction as said first optical axis deflecting unit and a projecting direction detecting unit for detecting a deflection angle and a deflecting direction by said first optical axis deflecting unit, wherein it is so arranged that said distance measuring light is projected through said first optical axis deflecting unit and said reflected distance measuring light is received by said photodetection element through said second optical axis deflecting unit, wherein said first optical axis deflecting unit is composed by an overlapping pair of circular first optical prisms, said second optical axis deflecting unit is composed by an overlapping pair of circular second optical prisms, each of said first optical prisms is independently rotatable, each of said second optical prisms is independently rotatable and it is so arranged that one of said first optical prisms and one of said second optical prisms are rotated in synchronization with each other, and it is so arranged that the other of said first optical prisms and the other of said second optical prisms are rotated in synchronization with each other, and a three-dimensional data of a measuring point is obtained based on a distance measuring result of said distance measuring unit and a detection result of said projecting direction detecting unit.

2. The surveying instrument according to claim 1, wherein said second optical axis deflecting unit is composed by the overlapping pair of optical prisms and it is so arranged that each of the optical prisms is independently rotatable.

3. The surveying instrument according to claim 1, wherein the optical prisms which compose said second optical axis deflecting unit are Fresnel prisms.

4. The surveying instrument according to claim 1, further comprising; an arithmetic processing unit and a posture detecting device, wherein said posture detecting device is capable of detecting a tilt angle and a tilting direction of said projection optical axis with respect to the horizontal and said arithmetic processing unit is arranged so as to correct a distance measuring result of said distance measuring unit based on a detection result of said posture detecting device.

5. A three-dimensional camera comprising; said surveying instrument according to claim 1, an arithmetic processing unit and an image pickup device having an image pickup optical axis in parallel with said projection optical axis and having a known relation with said projection optical axis, wherein said arithmetic processing unit is configured so as to acquire an image with a three-dimensional data by associating a distance measuring result obtained by said surveying instrument with an image acquired by said image pickup device.

6. The three-dimensional camera according to claim 5, further comprising a posture detecting device, wherein said posture detecting device is capable of detecting a tilt angle and a tilting direction of said projection optical axis with respect to the horizontal and said arithmetic processing unit is configured so as to correct a distance measuring result of said distance measuring unit based on a detection result of said posture detecting device.

7. The surveying instrument according to claim 2, wherein the optical prisms which compose said second optical axis deflecting unit are Fresnel prisms.

8. A surveying instrument comprising; a light emitting element for emitting a distance measuring light, a distance measuring light projecting unit for projecting said distance measuring light, a light receiving unit for receiving a reflected distance measuring light, a photodetection element for receiving the reflected distance measuring light and for producing a photodetection signal and a distance measuring unit for performing a distance measurement based on a light receiving result from said photodetection element, further comprising a first optical axis deflecting unit disposed on a projection optical axis of said distance measuring light for deflecting an optical axis of said distance measuring light at a deflection angle as required and in a direction as required, a second optical axis deflecting unit disposed on a light receiving optical axis for deflecting the reflected distance measuring light at the same deflection angle and in the same direction as said first optical axis deflecting unit and a projecting direction detecting unit for detecting a deflection angle and a deflecting direction by said first optical axis deflecting unit, wherein it is so arranged that said distance measuring light is projected through said first optical axis deflecting unit and said reflected distance measuring light is received by said photodetection element through said second optical axis deflecting unit, wherein said distance measuring light projecting unit has a reflection mirror for coinciding said projection optical axis with said light receiving optical axis, wherein said second optical axis deflecting unit is composed by an overlapping pair of circular second optical prisms, said first optical axis deflecting unit is composed by an overlapping pair of circular first optical prisms, wherein said first optical prisms are provided at a center of said second optical prism, said first optical prisms and said second optical prisms are integrated, each of the integrated optical prisms is configured as independently rotatable, and a three-dimensional data of a measuring point is obtained based on a distance measuring result of said distance measuring unit and a detection result of said projecting direction detecting unit.

9. The surveying instrument according to claim 8, wherein the optical prisms which compose said second optical axis deflecting unit are Fresnel prisms.

* * * * *